United States Patent [19]

Froyman

[11] 4,227,629
[45] Oct. 14, 1980

[54] DETACHABLE SPOUT AND CLOSURE

[76] Inventor: Abraham Froyman, 110-20 Flave Apt. 308, Forest Hills, N.Y. 11375

[21] Appl. No.: 18,464

[22] Filed: Mar. 7, 1979

[51] Int. Cl.³ .................... B65D 5/72; B65D 25/40; B65D 35/38
[52] U.S. Cl. ................. 222/566; 220/85 SP
[58] Field of Search .................. 220/85 SP; 222/566–569, 535, 539; 229/7 R; 285/201, 202

[56] References Cited

U.S. PATENT DOCUMENTS

| | | | |
|---|---|---|---|
| 3,856,188 | 12/1974 | Newby | 220/85 SP |
| 3,865,270 | 2/1975 | Petersson | 220/85 SP |

*Primary Examiner*—G. T. Hall
*Attorney, Agent, or Firm*—Ilya Zborovsky

[57] ABSTRACT

A device for closing and opening a container has a tubular member having an axis, an inner hollow and two open end portions one of which is detachably connectable with a container so as to surround its opening, and a closing member movable between a first position in which it closes the other end portion of the tubular member so as to prevent access to the container's opening, and a second position in which said closing member is removed from the other end portion of the tubular member so as to allow the access to the container's opening. The tubular member may be fixed to the container in the region of its opening by a plurality of fixing means.

15 Claims, 7 Drawing Figures

DETACHABLE SPOUT AND CLOSURE

SUMMARY OF THE INVENTION

The present invention relates to a device for closing an opening of a container.

Many containers which accomodate liquid and solid materials have a disadvantage in that when they are once opened, they cannot be hermetically closed after such opening. This is true, for example for such containers as paper food containers accomodating juices and other drinks, for boxes accommodating salt, dough, sugar and the like, for sacks accommodating cement and other construction materials. These containers are not hermetically closed after opening, and therefore the materials contained therein are subjected to deleterious action of the surrounding conditions are dirtied by insects, rodents and the like.

Accordingly, it is an object of the present invention to provide a device which avoids the disadvantages of the prior art.

More particularly, it is an object of the present invention to provide a device which guarantees closing of a container which has been opened before, and such closing is performed easily and inexpensively.

In keeping with these objects and with others which will become apparent hereinafter, one feature of the present invention resides, briefly stated, in a device which has a tubular member having two open end portions, one of which open end portions being detachably connected with the container, whereas the other open end portion is associated with a closing member, the latter being movable between a closed position in which it closes the other open end of the tubular member so as to interrupt access to the container's opening, and an open position in which the closing member is removed so that access to the container's opening is unobstructed.

Thus, the tubular member can be temporality attached to an outer or inner surface of the container so as to surround its opening, and the closing member can close or open the tubular member. After emptying and utilizing of the container, the tubular member can be removed and attached to a new container. The above mentioned opening in container may be made by any known method.

The novel features which are considered to be characteristic for the present invention are set forth in detail in the appended claims. The invention itself, however, both as to its construction and its method of manufacture and operation, together with additional objects and advantages thereof, will be best understood from the following specification and description of specific embodiments when read in connection with the accompanying drawings.

DESCRIPTION OF PREFERRED EMBODIMENTS

Figure 1:
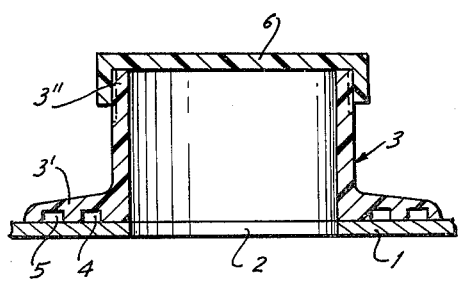
FIG. 1 is a view showing a section of a device for closing an opening a container in accordance with a first embodiment of the present invention.

FIG. 1 depicts a device for closing and opening a container whose wall is identified by reference numeral 1. The device has a tubular member 3 having an axis and one axial end portion 3' which is hermetically connectable with the wall 1 of the container so as to surround the opening 2 which is produced in the wall 1 by known methods. The hermetic connection is attained by that the end portion 3' is constituted by an elastic material such as a synthetic plastic material (advantageously rubber), and has at least one groove 4. Two or more such grooves 4 and 5 may be provided whereas only two are shown in FIG. 1.

When the end portion 3' of the tubular member 3 is firmly pressed against the wall 1 of the container, air is expelled from the grooves 4 and 5 and thereby the end portion 3' is attracted to the wall 1. This connection is detachable inasmuch as the end portion 3' can be separated from the wall 1 by pulling the tubular member 3 away from the same.

Another axial end portion 3" of the tubular member 3 is closed by a cap 6 which is provided, for example, with a thread which meshes with a thread provided on the tubular member 3. Thus, the opening 2 of the container is hermetically closed when the cap 6 is screwed on the end portion 3" of the tubular member 3. When it is necessary to discharge the material from the container which is originally closed, the opening 2 is first made in the wall 1 of the container. For example, the opening 2 may be made by cutting the wall 1 of the milk container or cement sack. Then, the end portion 3' of the tubular member 3 is attached to the wall 1 so as to surround the opening 2. The cap 6 is fitted onto the end portion 3" of the tubular member 3. For discharging purposes, the cap 6 is removed from the tubular member 3 and a necessary amount of the container contents is discharged through the thus opened tubular member 3. Then, the cap 6 is again screwed onto the tubular member 3 and the container is hermetically closed.

Figure 2:
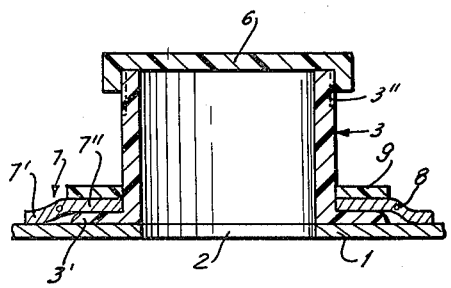
FIG. 2 is a view showing a section of a device for closing and opening in accordance with a second embodiment of the present invention.

When the container is emptied, the tubular member is detached therefrom and attached to a new container in the same way. Filling of the container with a material is performed similarly. The tubular member may have any cross section, such as square, circular and the like. FIG. 2 depicts a device in accordance with a further embodiment of the present invention. In this case, a disc 7 is fitted on the tubular member 3. the disc has a radially outer section 7' and a radially inner section 7". The section 7" is located axially outwardly of and in contact with the end portion 3' of the tubular member 3 so as to press the same toward and retain the same near the wall 1 of the container. The section 7' is connected with the wall 1 of the container by a layer of glue. The lower surface of the section 7' may also be self-sticking and the like.

A separating member such as a thread or the like identified by reference numeral 8 is embedded in the disc 7 in the region between the sections 7' and 7". When the tubular member is to be detached from the container, the thread 8 is pulled in a circumferential direction and cuts through the above mentioned regions between the sections 7' and 7" thereby separating the same from each other. An additional holding disc 9 may be screwed onto the tubular member 3 so as to urge the section 7" of the disc 7 into firm abutment against the end portion 3' of the tubular member 3.

Figure 3:
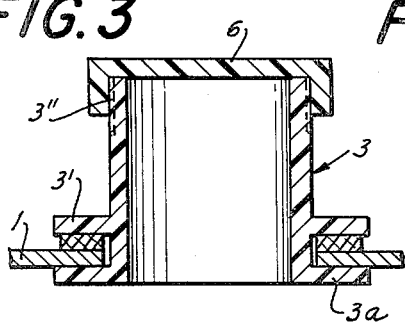
FIG. 3 is a view showing a section of a device for closing and opening in accordance with a third embodiment of the present invention.
Figure 3A:
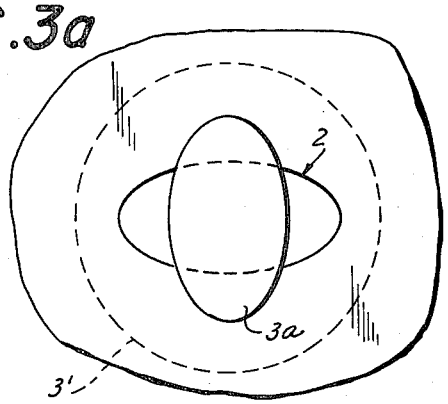
FIG. 3a is a plan view of the device for closing and opening shown in FIG. 3.

The tubular member 3 may engage the wall 1 of the container from inside. As can be seen from FIGS. 3, 3a, this portion can be shaped with an oval extension 3a and separated by a groove from the remainder portion of the tubular member 3. The opening 2 of the wall 1 of the container is also oval-shaped. In order to insert the end portion 3' of the tubular member 3 into the opening 2, the end portion 3' is so placed on the wall 1 that the axes of the oval extension 3a of the end portion 3' and the opening 2 coincide with each other. Then the portion 3a is pushed through the opening 2 into the interior of the container to a small extent, and immediately after this is turned so as to deviate from the above mentioned coincidence with the oval-shaped opening. Thus, the end portion 3a of the tubular member 3 engages the wall 1 of the container from inside.

Figure 4:
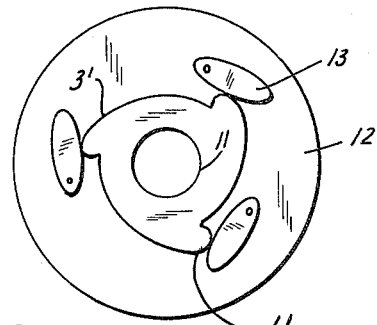
FIG. 4 is a plan view of a device for closing and opening in accordance with a fourth embodiment of the present invention.

As depicted in FIG. 4, the end portion 3' may be provided with a plurality of radially extending projections 11. An additional disc 12 is asociated with the tubular member 3 and has a plurality of rotatable engaging members 13. When the disc 12 is inserted into the interior of the container through the opening 2 and the tubular member 3 rotates in a direction identified by the arrow, the projections 11 turn the engaging members 13 so that the latter extend beyond the outer contour of the disc 12 and engage the wall 1 of the container from inside.

Figure 5:
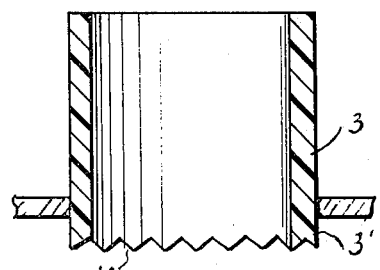
FIG. 5 shows a device for closing and opening which simultaneously serves as a tool for making an opening in a container.

The tubular member 3 of FIG. 5 is provided with means for making the opening 2 in the wall 1 of the container. This means may be formed by a plurality of teeth 14 provided in the region of the end portion 3'. By rotating of the tubular member 3 and firmly pressing the teeth 14 against the wall 1 of the container, the teeth 14 cut through the opening 2 in the wall 1. When the opening is made, the tubular member 3 can again be detachably connected to the wall 1 of the container by any of the above described methods.

Figure 6:
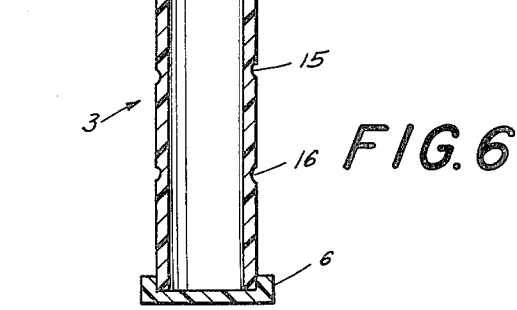
FIG. 6 is a view showing a device for closing and opening which simultaneously serves as a dosing vessel for dosing a material to be discharged from the container.

Advantageously, the tubular member 3 has a relatively big length. More particularly, it has such a length that it guides the material when the latter moves through the tubular member from the container or vice versa. This is shown in FIG. 6 in which the tubular member 3 is formed as a long pipe.

The tubular member 3 may also serve dosing purposes. For example, it may be flexible as a result of being constituted by a flexible material. When the cap 6 is screwed on the tubular member 3 and a dose of the material is discharged into the tubular member 3, the latter may be bent in the direction transverse to the axis of the tubular member in the region adjacent to the end portion 3'. Thereby the dose of the material received into the tubular member 3 is separated from the interior of the container, After removal of the cap 6, the thus separated dose can be discharged from the tubular member 3.

Means for facilitating the above-mentioned bending may be provided. This means may be formed by a groove 15 at a predetermined axial location of the tubular member 3. The tubular member in this case may be substantially rigid over the entire length with the exception of the region of the groove 15 wherein the tubular member 3 is flexible. The separating of a dose is performed by bending of the tubular member 3 in the region of the groove 15. Several such grooves may be provided in the tubular member 3 and spaced from one another in the axial direction of the latter. In this case it is possible to bend the tubular member 3 in the region of the groove 16 so as to separate and thereafter to discharge a small dose of material accommodated within the region between the groove 16 and the cap 6. It is also possible to bend the tubular member 3 in the region of the groove 15 so as to separate and to thereafter discharge a greater dose accommodated between the regions of the groove 15 and cap 6.

It is also possible to, provide other constructions for connecting the tubular member with the wall of the container. For example, the end portion 3' of the tubular member 3 can be engaged in the opening 2 of the wall 1 with snap action, and the like. The tubular member may have cross-sections of different shapes.

It will be understood that each of the elements described above, or two or more together, may also find a useful application in other types of constructions differing from the types described above.

While the invention has been illustrated as embeddied in a closing an opening device of specific constructions, it is not intended to be limited to the details shown, since various modifications and structural changes may be made without departing from the spirit of the present invention.

Without further analysis, the foregoing will so fully reveal the gist of the present invention that others by applying current knowledge can readily adapt it for various applications without omitting features which, from the standpoint of the prior art, fairly constitute essential characteristics of the generic and specific aspects of this invention.

What is claimed as new and desired to be protected by Letters Patent is set forth in particular in the appended claims:

1. A device for closing an opening of a container comprising a tubular member having an axis, an inner hollow and two open end portions, one of said end portions of said tubular member being connectable with a container in the region of its opening so that said tubular member firmly surrounds the opening of the container and said inner hollow of said tubular member communicates with the interior of said container through the opening, said one end portion of said tubular member being connectable to the container directly and removably so that said tubular member can be disconnected from the container and connected with another such container;

a closing member for closing the other end portion of said tubular member and movable between a closed position in which said closing member is associated with said other end portion of said tubular member so as to close the same whereby a material accommodated in the interior of the container cannot be discharged from the latter and access to the interior of the container is prevented, and an open position in which said closing member is withdrawn from said other end portion of said tubular member whereby the material from the interior of the container can be discharged through said tubular member; and means for removably connecting said one portion of said tubular member to the container and allowing the disconnection of said tubular member from the container and the connection of the same to another container having unprepared opening without any connecting elements, said connecting means being a one piece member removably connectable with the container.

2. A device as defined in claim 1, said connecting means including an elastic section provided on said one end portion of said tubular member and a groove in said elastic section so that when said one end portion is pressed against the container and thereby compressed, air accommodated in said groove is expelled from the latter whereby said one end section is attracted to the container.

3. A device as defined in claim 1, said connecting means including a radially extending section provided on said one end portion of said tubular member and an annular member having an outer radial section provided with an adhesive and an inner radial section which does not have an adhesive, said annular member being fittable onto said one end portion of said tubular member so that said radially outer section adheres to the container and said radially inner section abuts axially outwardly against said radially extending section of said one end portion to thereby retain said tubular member near and connect the same with the container.

4. A device as defined in claim 3, wherein said one end portion of said tubular member has an outer surface provided with outer engaging formations; and further comprising a retaining disc having inner engaging formations engageable with said outer engaging formations of said one end portion and fittable on the latter so as to urge said annular member toward and to abutment against said radially extending section of said one end portion of said tubular member.

5. A device as defined in claim 1, said connecting means including at least one engaging element movably connected with said one end portion of said tubular member and movable between an engaging position in which it extends radially beyond an outer contour of said one end portion so that when said engaging element is located in the interior of the container it engages a wall surrounding the opening of the container from inside and the tubular member cannot be detached from the container, and a disengaging position in which it is withdrawn so as to be located within the contour of said one end portion so that said engaging element does not engage the wall surrounding the opening of the container and said tubular member can be detached from the latter, and an actuating member operative for moving said engaging element between said engaging and disengaging positions.

6. A device as defined in claim 3, and further comprising a separating element located in the region between said radially inner section and said radially outer section of said annular member and operative for separating said sections from each other while being pulled by a user, whereby said tubular member together with said radially extending section thereof and said radially inner section of said annular member can be disconnected from the container.

7. A device as defined in claim 1, wherein said tubular member has means for making the opening in the container prior to connecting said tubular member with the container.

8. A device as defined in claim 7, wherein said opening-making means includes a plurality of sawing teeth provided on said one end portion of said tubular member.

9. A device as defined in claim 1, wherein said tubular member has a length which is so selected as to guide a material during discharging of the latter from the interior of the container.

10. A device as defined in claim 1, wherein said tubular member is bendable in a direction transverse to said axis so that when a material is discharged into said tubular member in said closed position of said closing member, and said tubular member is bent in said transverse direction, a dose of the material is separated from the interior of the container in the thus bent tubular member.

11. A device as defined in claim 10, wherein means is provided for facilitating bending of said tubular member and including an axial location of said tubular member at which it has a rigidity lower than that in the remainder portion of said tubular member.

12. A device as defined in claim 11, and further comprising at least one additional such facilitating means which is spaced from said first mentioned facilitating means in an axial direction of said tubular member so that two differing doses of material can be separated in said tubular member.

13. A device as defined in claim 1, said connecting means including a disc-shaped section formed on said one end portion and a radially elongated portion spaced from said disc-shaped section in an axial direction, said radially elongated portion being insertable into an identical radially elongated opening of the container and rotatable about said axis so that it does not align with the radially elongated opening of the container and thereby engages the latter from inside, whereas said disc-shaped section closes the radially elongated opening of the container from outside.

14. A device as defined in claim 1, wherein said tubular member is formed as a throat.

15. A device as defined in claim 1, wherein said tubular member is an integral one piece member arranged to extend between the container and said closing member without interposition of additional members.

* * * * *

UNITED STATES PATENT AND TRADEMARK OFFICE
CERTIFICATE OF CORRECTION

PATENT NO. : 4,227,629
DATED : October 14, 1980
INVENTOR(S) : Abraham Froyman

It is certified that error appears in the above—identified patent and that said Letters Patent is hereby corrected as shown below:

On The Title Page, inventor's address should read

-- 110-20 71 Ave., Apt. 308

Forest Hills, N. Y. 11375 --.

Signed and Sealed this

Third Day of March 1981

[SEAL]

Attest:

RENE D. TEGTMEYER

Attesting Officer

Acting Commissioner of Patents and Trademarks